United States Patent
Lim

(10) Patent No.: US 9,641,767 B2
(45) Date of Patent: May 2, 2017

(54) DISPLAY APPARATUS AND METHOD USING HIGH DYNAMIC RANGE FUNCTION FOR VEHICLE

(71) Applicant: HYUNDAI MOBIS CO., LTD., Seoul (KR)

(72) Inventor: Hyung Sub Lim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 256 days.

(21) Appl. No.: 14/702,395

(22) Filed: May 1, 2015

(65) Prior Publication Data
US 2016/0165120 A1    Jun. 9, 2016

(30) Foreign Application Priority Data

Dec. 4, 2014 (KR) .......................... 10-2014-0173386

(51) Int. Cl.
*H04N 7/18* (2006.01)
*H04N 5/235* (2006.01)
*H04N 5/243* (2006.01)

(52) U.S. Cl.
CPC ......... *H04N 5/2355* (2013.01); *H04N 5/2351* (2013.01); *H04N 5/243* (2013.01)

(58) Field of Classification Search
CPC ..... H04N 5/2355; H04N 5/243; H04N 5/2351
USPC ........................................................ 348/148
See application file for complete search history.

(56) References Cited

U.S. PATENT DOCUMENTS

| 2014/0176718 A1* | 6/2014 | Kim .......................... B60R 1/00 348/148 |
| 2014/0192076 A1* | 7/2014 | Tan ....................... H04N 9/3147 345/582 |
| 2015/0035985 A1* | 2/2015 | Conneely ................ B60R 1/002 348/148 |

FOREIGN PATENT DOCUMENTS

| KR | 10-2009-0027480 A | 3/2009 |
| KR | 10-2011-0084025 A | 7/2011 |
| KR | 10-2013-0034185 A | 4/2013 |
| KR | 10-2013-0060110 A | 6/2013 |

(Continued)

OTHER PUBLICATIONS

Korean Office Action dated Oct. 28, 2015 of corresponding Korean Patent Application No. 10-2014-0173386—5 pages.

(Continued)

*Primary Examiner* — Allen Wong
(74) *Attorney, Agent, or Firm* — Knobbe Martens Olson & Bear LLP

(57) ABSTRACT

A display apparatus using an HDR function for a vehicle may include: a camera configured to capture an image around the vehicle; a luminance sensor configured to sense luminance around the vehicle; a camera image controller configured to analyze a luminance characteristic of the luminance inputted from the luminance sensor, and selectively apply the HDR function to the original image inputted from the camera; and a display controller configured to analyze the original image and the HDR-processed image which are inputted from the camera image controller, apply a transfer curve to the HDR-processed image according to the analysis result, compare the original image and the image to which the transfer curve is applied, and display any one of the original image and the image to which the transfer (Continued)

curve is applied, through a display unit according to the comparison result.

18 Claims, 4 Drawing Sheets

(56) References Cited

FOREIGN PATENT DOCUMENTS

KR    10-2013-0131717 A    12/2013

OTHER PUBLICATIONS

Notice of Allowance dated May 23, 2016 of corresponding Korean Patent Application No. 10-2014-0173386—3 pages.

* cited by examiner

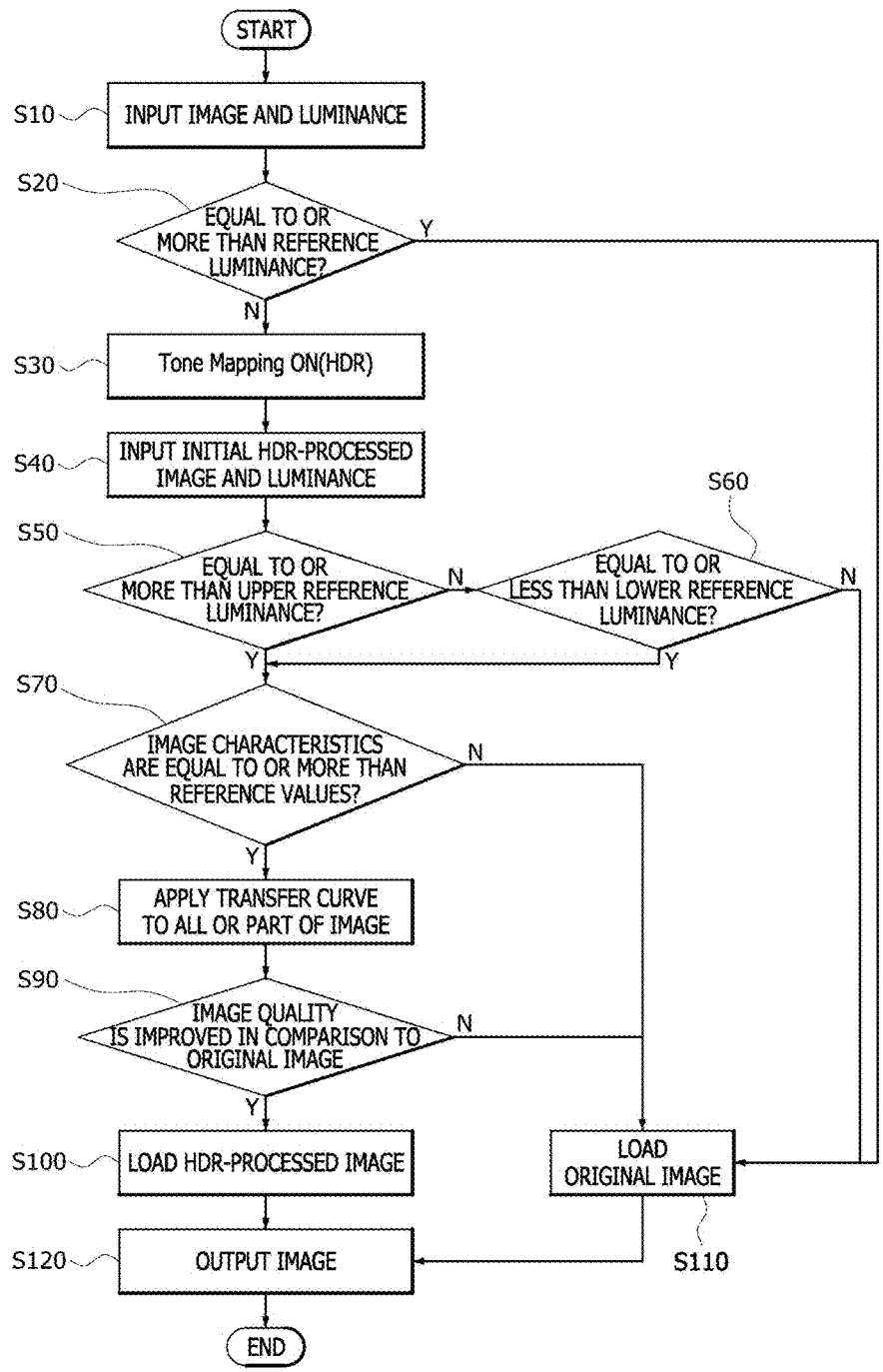

DISPLAY APPARATUS AND METHOD USING HIGH DYNAMIC RANGE FUNCTION FOR VEHICLE

CROSS-REFERENCES TO RELATED APPLICATIONS

The present application claims priority to Korean application number 10-2014-0173386, filed on Dec. 4, 2014, which is incorporated by reference in its entirety.

BACKGROUND

The present disclosure relates to a display apparatus and method using a high dynamic range (HDR) function for a vehicle, and more specifically, a display apparatus and method using an HDR function for a vehicle, which selectively applies the HDR function in a display for a vehicle.

In general, the HDR function refers to a digital image processing technique capable of processing a relatively high dynamic range image. The HDR function synthesizes a plurality of images captured through different exposures and acquires a high dynamic range image. The high dynamic range image is finally subjected to a tone mapping process which adjusts the captured images with various levels of luminance to an image with average luminance.

The related technology is disclosed in Korean Patent Laid-open Publication No. 10-2009-0027480 published on Mar. 17, 2009.

SUMMARY

Embodiments of the present invention are directed to a display apparatus and method using an HDR function for a vehicle, which analyzes various characteristics of an image and additionally performs an image improvement process matched to luminance and brightness of an image, thereby preventing a reduction in quality of the image.

Also, embodiments of the present invention are directed to a display apparatus and method using an HDR function for a vehicle, which compares an original image, an initial HDR-processed image, and a final HDR-processed image and outputs any one of the images according to the comparison result, thereby providing the most efficient image to a driver.

In one embodiment, a display apparatus using an HDR function for a vehicle may include: a camera configured to capture an image around the vehicle; a luminance sensor configured to sense luminance around the vehicle; a camera image controller configured to analyze a luminance characteristic of the luminance inputted from the luminance sensor, and selectively apply the HDR function to the original image inputted from the camera; and a display controller configured to analyze the original image and the HDR-processed image which are inputted from the camera image controller, apply a transfer curve to the HDR-processed image according to the analysis result, compare the original image and the image to which the transfer curve is applied, and display any one of the original image and the image to which the transfer curve is applied, through a display unit according to the comparison result.

The camera may acquire a plurality of images having different levels of brightness by differently setting an exposure time according to a control signal fed back from the camera image controller.

Then camera image controller may include: a luminance characteristic determination unit configured to analyze the luminance characteristic of the luminance inputted from the luminance sensor; and an HDR characteristic application determination unit configured to generate the HDR-processed image by selectively applying the HDR function to the original image according to the analysis result inputted from the luminance sensor.

When the luminance characteristic determination unit determines that the luminance is less than a preset reference luminance, the HDR characteristic application determination unit may generate the HDR-processed image by applying the HDR function to the original image, and input the HDR-processed image to the display controller. When the luminance characteristic determination unit determines that the luminance is equal to or more than the preset reference luminance, the HDR characteristic application determination unit may output the original image through the display unit.

After generating the HDR-processed image, the HDR characteristic application determination unit may input the HDR-processed image to the display controller when the luminance is equal to or more than a preset upper reference luminance or equal to or less than a preset lower reference luminance, and output the original image through the display unit when the luminance is less than the upper reference luminance and more than the lower reference luminance.

The display controller may include: an image characteristic determination unit configured to analyze the characteristics of the original image and the HDR-processed image inputted from the camera image controller; a transfer curve application unit configured to apply a transfer curve to the HDR-processed image according to the analysis result of the image characteristic determination unit, and generate an image to which the transfer curve is applied; and an HDR characteristic control unit configured to compare the details of the original image to the details of the image to which the transfer curve is applied, and output any one of the original image and the image to which the transfer curve is applied, through the display unit according to the comparison result.

The image characteristic determination unit may analyze one or more of average peak luminance (APL) and block-area luminance variance for each of the HDR-processed image and the original image.

The image characteristic determination unit may selectively output the original image through the display unit according to the characteristics of the HDR-processed image and the original image.

The transfer curve application unit may recover an overshot image of the HDR-processed image according to the analysis result of the image characteristic determination unit, and perform data matching according to the transfer curve.

The HDR characteristic control unit may detect edges of the original image and the image to which the transfer curve is applied, accumulate the total quantities of detected edges for the respective images, and determine whether the details of the image to which the transfer curve is applied were improved in comparison to the details of the original image, based on the accumulated total quantities of detected edges.

The HDR characteristic control unit may output the image to which the transfer curve is applied through the display unit when the details of the image to which the transfer curve is applied were improved in comparison to the details of the original image, and output the original image through the display unit when the details of the image to which the transfer curve is applied were not improved in comparison to the details of the original image.

In another embodiment, a display method using an HDR function for a vehicle may include: selectively applying, by a camera image controller, the HDR function to an original image inputted from a camera by analyzing a luminance characteristic of luminance inputted from a luminance sensor; analyzing, by a display controller, the original image and the HDR-processed image obtained through the camera image controller, and applying a transfer curve to the HDR-processed image according to the analysis result; and comparing, by the display controller, the original image to the image to which the transfer curve is applied, and outputting any one of the original image and the image to which the transfer curve is applied, through a display unit according to the comparison result.

The camera may acquire a plurality of images having different levels of brightness by differently setting an exposure time according to a control signal fed back from the camera image controller.

The applying of the HDR function to the original image may include generating the HDR-processed image by applying the HDR function to the original image and then inputting the HDR-processed image to the display controller when the luminance is less than a preset reference luminance, or outputting the original image through the display unit when the luminance is equal to or more than the preset reference luminance.

The applying of the transfer curve to the HDR-processed image may include analyzing one or more of APL and block-area luminance variance for each of the HDR-processed image and the original image.

The applying of the transfer curve to the HDR-processed image may include recovering an overshot image of the HDR-processed image according to the analysis result, and performing data matching according to the transfer curve.

The outputting of any one of the original image and the image to which the transfer curve is applied may include detecting edges of the original image and the image to which the transfer curve is applied, accumulating the total quantities of detected edges for the respective images, and determining whether the details of the image to which the transfer curve is applied were improved in comparison to the details of the original image, based on the accumulated total quantities of detected edges.

The outputting of any one of the original image and the image to which the transfer curve is applied may include outputting the image to which the transfer curve is applied through the display unit when the details of the image to which the transfer curve is applied were improved in comparison to the details of the original image, and outputting the original image through the display unit when the details of the image to which the transfer curve is applied were not improved in comparison to the details of the original image.

BRIEF DESCRIPTION OF THE DRAWINGS

FIG. 4 is a flowchart illustrating a display method using an HDR function for a vehicle in accordance with an embodiment of the present invention.

DESCRIPTION OF EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

The HDR function is utilized for general cameras. However, since the HDR function is not utilized for cameras for a vehicle due to a realistic environmental limit, the actual environmental limit needs to be overcome so that the HDR function can be used for the cameras for a vehicle.

Figure 1:
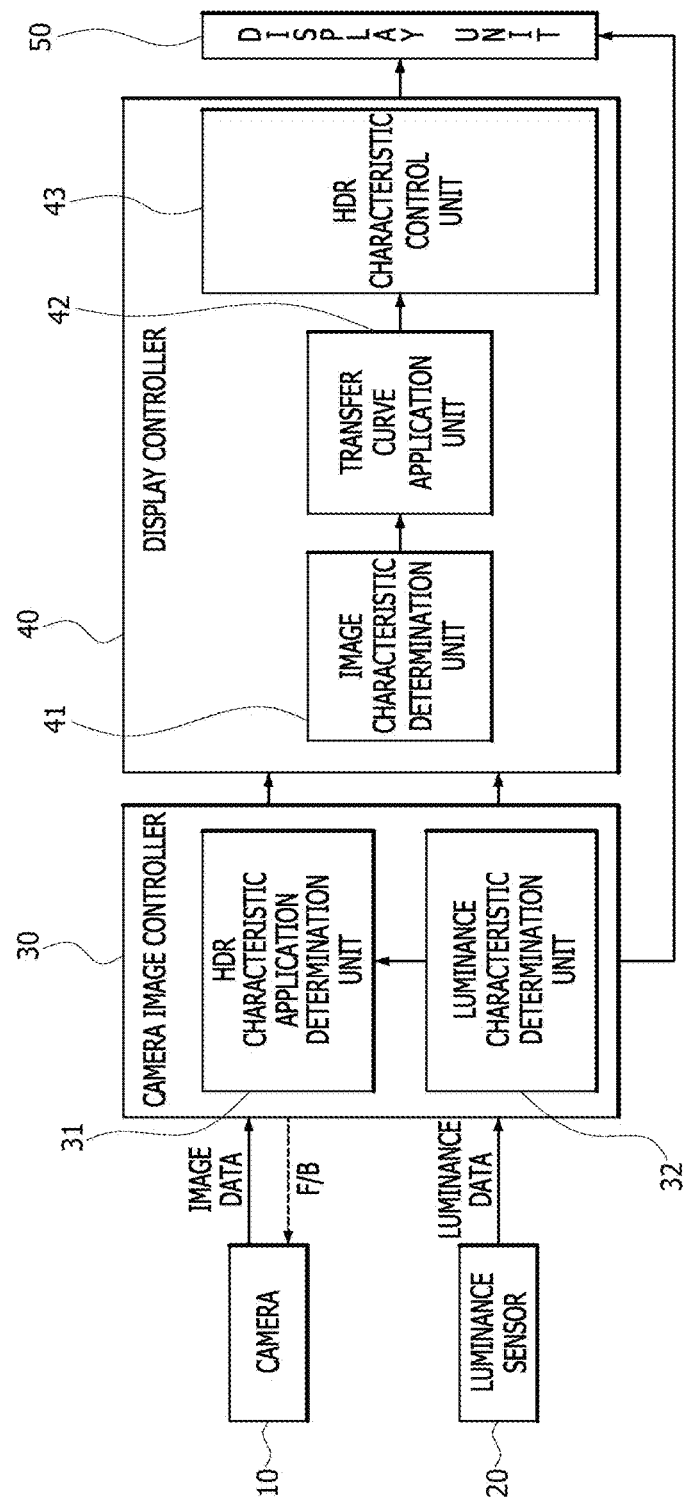
FIG. 1 is a block diagram of a display apparatus using an HDR function for a vehicle in accordance with an embodiment of the present invention.
Figure 2:
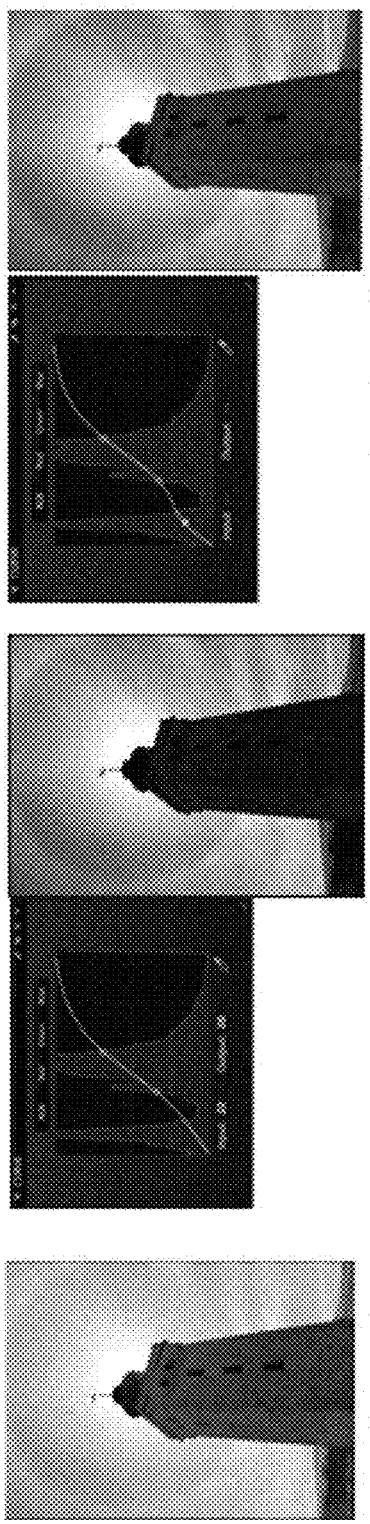
FIG. 2 is a diagram illustrating an example in which an original image and an image to which a transfer curve is applied are compared to each other in accordance with the embodiment of the present invention.
Figure 3:
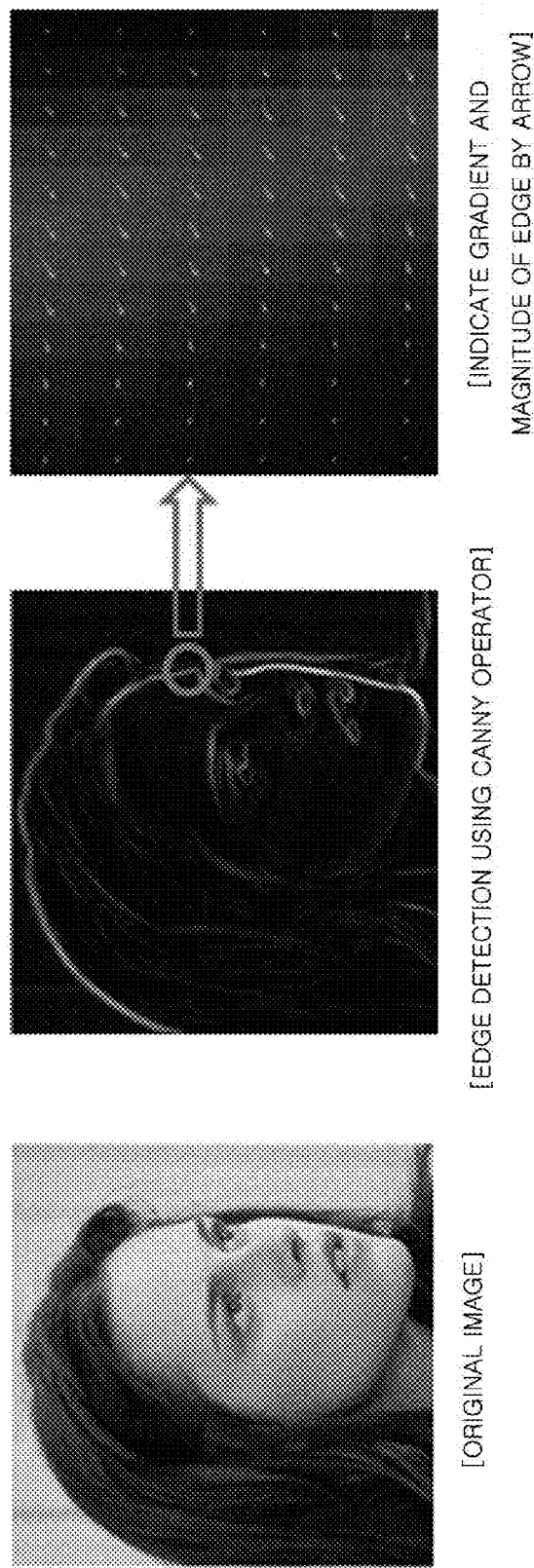
FIG. 3 is a diagram illustrating an example in which edge detection is performed in accordance with the embodiment of the present invention.

FIG. 1 is a block diagram of a display apparatus using an HDR function for a vehicle in accordance with an embodiment of the present invention. FIG. 2 is a diagram illustrating an example in which an original image and an image to which a transfer curve is applied are compared to each other in accordance with the embodiment of the present invention. FIG. 3 is a diagram illustrating an example in which edge detection is performed in accordance with the embodiment of the present invention.

Referring to FIG. 1, the display apparatus using an HDR function for a vehicle in accordance with the embodiment of the present invention may include a camera 10, a luminance sensor 20, a camera image controller 30, a display controller 40, and a display unit 50.

The camera 10 may capture an image around a vehicle. The vehicle may include a plurality of cameras 10 installed thereon. The plurality of cameras 10 may have exposure times which are differently set according to a control signal F/B fed back from the camera image controller 30, and acquire a plurality of images having different levels of brightness. The images acquired through the cameras 10 may be inputted to the camera image controller 30.

The luminance sensor 20 may sense the luminance around the vehicle, and input the sensed luminance to the camera image controller 30. The vehicle may include a plurality of luminance sensors 20 installed thereon.

The camera image controller 30 may receive an image and luminance from the camera 10 and the luminance sensor 20, and selectively activate the HDR function according to the luminance characteristic. Then, the camera image controller 30 may process the original image through the HDR function. Through this operation, the camera image controller 30 may acquire the original image and the HDR-processed image to which the HDR characteristic is applied.

The camera image controller 30 may include an HDR characteristic application determination unit 31 and a luminance characteristic determination unit 32.

The luminance characteristic determination unit 32 may analyze the characteristic of the luminance inputted from the luminance sensor 20. The luminance characteristic determination unit 32 may continuously receive the luminance from the luminance sensor 20, determine whether the luminance is equal to or more than a preset reference luminance, and input the determination result to the HDR characteristic application determination unit 31. The reference luminance may be set to a level at which the original image can secure sufficient details without applying a separate HDR function.

Furthermore, after the HDR function is applied to the original image through the HDR characteristic application determination unit 31, the luminance characteristic determination unit 32 may determine whether the luminance is equal to or more than a preset upper reference luminance and equal to or less than a preset lower reference luminance, and input the determination result to the HDR characteristic application determination unit 31. The upper reference luminance or the lower reference luminance may indicate the case in which that the luminance around the vehicle is excessively high or low. In this case, the HDR function needs to be applied. The upper reference luminance and the lower reference luminance may be previously set.

The HDR characteristic application determination unit 31 may receive an image from the camera 10, and acquire multi-luminance images by feedback controlling the camera 10. Furthermore, the HDR characteristic application determination unit 31 may apply the HDR function to the original image according to the determination result inputted from the luminance characteristic determination unit 32. That is, when the luminance characteristic determination unit 32 determines that the luminance is equal to or more than the reference luminance, the HDR characteristic application determination unit 31 may transmit the original image to the display unit 50. When the luminance is less than the reference luminance, the HDR characteristic application determination unit 31 may acquire an HDR-processed image by applying the HDR function. In this case, the HDR function may include a tone mapping process.

For reference, when a range which can be displayed by one image is accumulated to form one image, a large range can be displayed. For example, when three 8-bit images are accumulated, one 24-bit image may be obtained. However, when the display unit 50 cannot display such a range of image, the image needs to be adjusted to such a range that can be displayed by the display unit 50. In the above-described example, the 24-bit image needs to be adjusted to the 8-bit image. Such a process may be referred to a tone mapping process.

Furthermore, when the luminance characteristic determination unit 32 determines that the luminance is equal to or more than the upper reference luminance or equal to or less than the lower reference luminance after the HDR function is applied to the original image, the HDR characteristic application determination unit 31 may input the HDR-processed image to the display controller 40.

The display controller 40 may analyze the original image and the HDR-processed image which are received from the camera image controller 30, apply a transfer curve to the HDR-processed image according to the analysis result, and compare the details of the original image to the details of the image to which the transfer curve is applied. Then, according to the comparison result, the display controller 40 may output any one of the images through the display unit 50.

The display controller 40 may include an image characteristic determination unit 41, a transfer curve application unit 42, and an HDR characteristic control unit 43.

The image characteristic determination unit 41 may analyze the characteristics of the original image and the HDR-processed image which are received from the HDR characteristic application determination unit 31, and output the original image through the display unit 50 according to the analysis result.

That is, the image characteristic determination unit 41 may analyze image characteristics for each of the HDR-processed image and the original image, such as average peak luminance (APL) and block-area luminance variance. At this time, when the APL and block-area luminance variance for each of the HDR-processed image and the original image are equal to or more than preset reference values, respectively, the image characteristic determination unit 41 may input the HDR-processed image to the transfer curve application unit 42 such that a transfer curve can be applied to the HDR-processed image. On the other hand, when the APL and block-area luminance variance for each of the HDR-processed image and the original image are less than preset reference values, respectively, the image characteristic determination unit 41 may output the original image through the display unit 50. The reference values may be set for the above-described image characteristics, respectively, and used for determining whether to output the original image.

The transfer curve application unit 42 may apply a transfer curve to all or part of the image, according to the image characteristics analyzed through the image characteristic determination unit 41. In this case, the transfer curve application unit 42 may recover an overshot image according to an image characteristic such as the luminance of the analyzed image (HDR-processed image), and improve the details of the image (HDR-processed image) by performing data matching to replace existing RGB data with new RGB data according to a previously stored transfer curved. The transfer curved may be previously stored as described above, but calculated in real time.

Referring to FIG. 2, the transfer curve may indicate a function of replacing existing RGB data with RGB data. The transfer curve can be applied to various color spaces such as HSV (Hue Saturation Value), in addition to the RGB model. The transfer curve may be defined and improved by establishing various formulas and theories according to the purpose thereof. The transfer curve in accordance with the present embodiment may be applied to recover overshot and lost data such that an image with improved details can be provided to a driver. Furthermore, the transfer curve in accordance with the present embodiment can be derived based on various images in an actual operation environment of the vehicle. In this case, the transfer curve may be stored in the form of a lookup table (LUT) constructed through transfer curve modeling, or calculated in real time through input data.

The HDR characteristic control unit 43 may compare the details of the original image to the details of the image to which the transfer curve is applied, and output any one of the images to the display unit 50 according to the comparison result.

The method for comparing the details of the original image to the details of the image to which the transfer curve is applied may include a method for accumulating and comparing the total quantities of edges for the respective images after edge detection.

Examples of the method for accumulating and comparing the total quantities of edges after edge detection may include an image improvement determination algorithm. Whether an image was improved may be determined through various methods.

The HDR function may be aimed at making a bright part brighter, making a dark part darker, and making an invisible part more visible. However, when the display unit 50 cannot display a high luminance and high contrast ratio, tone mapping needs to be performed to adjust the range to such a range that can be displayed by the display unit 50. In the in-vehicle display field, an optimal image for a driver is an image in which vision is secured.

The image improvement determination algorithm may determine that an image is an improved image when the details of the image can be more clearly recognized.

Thus, as illustrated in FIG. 3, the HDR characteristic control unit 43 may detect the edges of the original image and the image to which the transfer curve is applied, accumulate the total quantities of the edges for the respective images, and determine whether the details of the transfer curve-applied image were improved in comparison to the details of the original image, based on the accumulated total quantities.

The tone mapping process may indicate an example in which the transfer curve is applied as well as a general example in which the HDR effect is applied. As described above, when a range which can be displayed by one image is accumulated to form one image, the corresponding image can be expressed in a large range. For example, when three 8-bit images are accumulated, one 24-bit image may be obtained. However, when the display unit 50 cannot display the above-described range of image, the range needs to be adjusted to such a range that can be displayed by the display unit 50 (24 bit->8 bit). Even when the transfer curve is applied, the tone mapping process needs to be finally performed in order to display the image through the display unit 50. Referring to FIG. 3, the 8-bit image processed through the tone-mapping process may include more detail information than the initial 8-bit image.

The edge detection refers to an image processing operation for searching for edges of an image. During the edge detection, a convolution mask with a predetermined size may be used. After the edge detection, the gradient and magnitude of each edge for each pixel may be derived. As the magnitude for each area is accumulated, edge counting can be performed or the magnitudes of the edges of the image may be compared. When it is assumed that the same operator is applied to various images, a large quantity of edges may be detected from a high-frequency image of which the contrast ratio is high, and a small quantity of edges may be detected from a low-frequency image of which the contrast ratio is low, that is, which is blurred. The HDR function serves to clearly express a blurred part of which the edges are not normally detected, such that a large quantity of edges can be detected from the part. Thus, among the HDR effects, whether the details were improved can be determined through edge detection and edge counting.

The display unit 50 may output the image inputted from the display controller 40 as described above.

Hereafter, a display method using an HDR function for a vehicle in accordance with an embodiment of the present invention will be described in detail with reference to FIG. 4.

FIG. 4 is a flowchart illustrating a display method using an HDR function for a vehicle in accordance with an embodiment of the present invention.

Referring to FIG. 4, the camera 10 may capture an image around the vehicle and input the captured image to the HDR characteristic application determination unit 31, and the luminance sensor 20 may sense the luminance around the vehicle and input the sensed luminance to the luminance characteristic determination unit 32, at step S10. In this case, the camera 10 may differently set the exposure time thereof according to a control signal fed back from the camera image controller 30, and acquire a plurality of images having different levels of brightness.

The luminance characteristic determination unit 32 may receive the luminance from the luminance sensor 20. At this time, the luminance characteristic determination unit 32 may determine whether the received luminance is equal to or more than preset reference luminance, at step S20, and input the determination result to the HDR characteristic application unit 31.

At this time, when the luminance is equal to or more than the preset reference luminance, the HDR characteristic application determination unit 31 may input the original image received from the camera 10 to the display controller 40. The display controller 40 may load the original image to the display unit 50 at step S110, and output the original image through the display unit 50 at step S120.

When it is determined at step S20 that the luminance is less than the reference luminance, the HDR characteristic application determination unit 31 may perform the HDR function (tone mapping process) at step S30.

Then, the HDR characteristic application determination unit 31 may acquire the HDR-processed image, and the luminance characteristic determination unit 32 may receive the luminance from the luminance sensor 20 at step S40.

In this case, the luminance characteristic determination unit 32 may determine whether the luminance is equal to or more than an upper reference luminance and equal to or less than a lower reference luminance, at steps S50 and S60. Then, the luminance characteristic determination unit 32 may input the determination result to the HDR characteristic application determination unit 31.

At this time, when the luminance characteristic determination unit 32 determines that the luminance is less than the upper reference luminance and more than the lower reference luminance, the HDR characteristic application determination unit 31 may load the original image received from the camera 10 to the display unit 50 at step S110, and output the original image through the display unit 50 at step S120.

On the other hand, when the luminance characteristic determination unit 32 determines that the luminance is equal to or more than the upper reference luminance or equal to or less than the lower reference luminance, the HDR characteristic application determination unit 31 may input the original image and the HDR-processed image to the image characteristic determination unit 41 of the display controller 40.

The image characteristic determination unit 41 may analyze the image characteristics of the HDR-processed image inputted from the HDR characteristic application determination unit 31, such as APL and block-area luminance variance, and determine whether the APL and block-area luminance variance are equal to or more than preset reference values, at step S70.

When it is determined at step S70 that the APL and block-area luminance variance of the HDR-processed image are less than the preset reference values, respectively, the image characteristic determination unit 41 may load the original image to the display unit 50 at step S110, and output the original image through the display unit 50 at step S120.

On the other hand, when it is determined at step S70 that the APL and block-area luminance variance of the HDR-processed image are equal to or more than the preset reference values, respectively, the transfer curve application unit 42 may apply a transfer curve to all or part of the image according to the image characteristics analyzed through the image characteristic determination unit 41, at step S80. That is, the transfer curve application unit 42 may recover the overshot image according to the image characteristics such as the luminance of the analyzed image (HDR-processed image), and improve the details of the image (HDR-processed image) by performing data matching to replace existing RGB data with new RGB data according to the previously stored transfer curved.

Then, the HDR characteristic control unit 43 may compare the details of the original image to the details of the image to which the transfer curve is applied, and determine whether the quality of the image to which the transfer curve is applied was improved in comparison to the quality of the original image, at step S90. In this case, the HDR characteristic control unit 43 may perform edge detection on the original image and the image to which the transfer curved is applied, accumulate and compare the total quantities of edges for the respective images, and determine whether the quality of the image to which the transfer curve is applied was improved in comparison to the quality of the original image.

When it is determined at step S90 that the quality of the image to which the transfer curve is applied was not improved in comparison to the quality of the original image, the HDR characteristic control unit 43 may load the original image to the display unit 50 at step S110, and output the original image through the display unit 50 at step S120.

On the other hand, when it is determined at step S90 that the quality of the image to which the transfer curve is applied was improved in comparison to the quality of the original image, the HDR characteristic control unit 43 may load the newly generated image, that is, the image to which the transfer curve is applied, to the display unit 50 at step S110, and output the corresponding image through the display unit 50 at step S120.

In the present embodiment, the display apparatus and method may analyze various characteristics of an image, and additionally perform an image improvement process which is matched with luminance and brightness of an image object, thereby preventing a reduction in quality of the image.

Furthermore, the display apparatus and method may compare the original image, the initial HDR-processed image, and the final HDR-processed image, and display any one of the images, thereby providing the most efficient image to a driver.

Although embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A display apparatus using a high dynamic range (HDR) function for a vehicle, comprising:
a camera configured to capture an original image around the vehicle;
a luminance sensor configured to sense luminance around the vehicle;
a camera image controller configured to analyze a luminance characteristic of the luminance inputted from the luminance sensor, and selectively apply the HDR function to the original image inputted from the camera; and
a display controller configured to analyze the original image and an HDR-processed image which are inputted from the camera image controller, apply a transfer curve to the HDR-processed image according to the analysis result, compare the original image and the image to which the transfer curve is applied, and display any one of the original image and the HDR-processed image to which the transfer curve is applied, through a display unit according to the comparison result.

2. The display apparatus of claim 1, wherein the camera acquires a plurality of images having different levels of brightness by differently setting an exposure time according to a control signal fed back from the camera image controller.

3. The display apparatus of claim 1, wherein the camera image controller comprises:
a luminance characteristic determination unit configured to analyze the luminance characteristic of the luminance inputted from the luminance sensor; and
an HDR characteristic application determination unit configured to generate the HDR-processed image by selectively applying the HDR function to the original image according to the analysis result inputted from the luminance sensor.

4. The display apparatus of claim 3, wherein when the luminance characteristic determination unit determines that the luminance is less than a preset reference luminance, the HDR characteristic application determination unit generates the HDR-processed image by applying the HDR function to the original image, and inputs the HDR-processed image to the display controller, and
when the luminance characteristic determination unit determines that the luminance is equal to or more than the preset reference luminance, the HDR characteristic application determination unit outputs the original image through the display unit.

5. The display apparatus of claim 4, wherein after generating the HDR-processed image, the HDR characteristic application determination unit inputs the HDR-processed image to the display controller when the luminance is equal to or more than a preset upper reference luminance or equal to or less than a preset lower reference luminance, and outputs the original image through the display unit when the luminance is less than the upper reference luminance and more than the lower reference luminance.

6. The display apparatus of claim 1, wherein the display controller comprises:
an image characteristic determination unit configured to analyze the characteristics of the original image and the HDR-processed image inputted from the camera image controller;
a transfer curve application unit configured to apply a transfer curve to the HDR-processed image according to the analysis result of the image characteristic determination unit, and generate an image to which the transfer curve is applied; and
an HDR characteristic control unit configured to compare the details of the original image to the details of the image to which the transfer curve is applied, and output any one of the original image and the image to which the transfer curve is applied, through the display unit according to the comparison result.

7. The display apparatus of claim 6, wherein the image characteristic determination unit analyzes one or more of average peak luminance (APL) and block-area luminance variance for each of the HDR-processed image and the original image.

8. The display apparatus of claim 6, wherein the image characteristic determination unit selectively outputs the original image through the display unit according to the characteristics of the HDR-processed image and the original image.

9. The display apparatus of claim 6, wherein the transfer curve application unit recovers an overshot image of the HDR-processed image according to the analysis result of the image characteristic determination unit, and performs data matching according to the transfer curve.

10. The display apparatus of claim 6, wherein the HDR characteristic control unit detects edges of the original image and the image to which the transfer curve is applied, accumulates the total quantities of detected edges for the respective images, and determines whether the details of the image to which the transfer curve is applied were improved in comparison to the details of the original image, based on the accumulated total quantities of detected edges.

11. The display apparatus of claim 10, wherein the HDR characteristic control unit outputs the image to which the transfer curve is applied through the display unit when the details of the image to which the transfer curve is applied were improved in comparison to the details of the original image, and outputs the original image through the display unit when the details of the image to which the transfer curve is applied were not improved in comparison to the details of the original image.

12. A display method using an high dynamic range (HDR) function for a vehicle, comprising:
selectively applying, by a camera image controller, the HDR function to an original image inputted from a camera by analyzing a luminance characteristic of luminance inputted from a luminance sensor;
analyzing, by a display controller, the original image and an HDR-processed image obtained through the camera image controller, and applying a transfer curve to the HDR-processed image according to the analysis result; and
comparing, by the display controller, the original image to the image to which the transfer curve is applied, and outputting any one of the original image and the HDR-processed image to which the transfer curve is applied, through a display unit according to the comparison result.

13. The display method of claim 12, wherein the camera acquires a plurality of images having different levels of brightness by differently setting an exposure time according to a control signal fed back from the camera image controller.

14. The display method of claim 12, wherein the applying of the HDR function to the original image comprises generating the HDR-processed image by applying the HDR function to the original image and then inputting the HDR-processed image to the display controller when the luminance is less than a preset reference luminance, or outputting the original image through the display unit when the luminance is equal to or more than the preset reference luminance.

15. The display method of claim 12, wherein the applying of the transfer curve to the HDR-processed image comprises analyzing one or more of APL and block-area luminance variance for each of the HDR-processed image and the original image.

16. The display method of claim 12, wherein the applying of the transfer curve to the HDR-processed image comprises recovering an overshot image of the HDR-processed image according to the analysis result, and performing data matching according to the transfer curve.

17. The display method of claim 12, wherein the outputting of any one of the original image and the image to which the transfer curve is applied comprises detecting edges of the original image and the image to which the transfer curve is applied, accumulating the total quantities of detected edges for the respective images, and determining whether the details of the image to which the transfer curve is applied were improved in comparison to the details of the original image, based on the accumulated total quantities of detected edges.

18. The display method of claim 12, wherein the outputting of any one of the original image and the image to which the transfer curve is applied comprises outputting the image to which the transfer curve is applied through the display unit when the details of the image to which the transfer curve is applied were improved in comparison to the details of the original image, and outputting the original image through the display unit when the details of the image to which the transfer curve is applied were not improved in comparison to the details of the original image.

* * * * *